(12) United States Patent
Boss et al.

(10) Patent No.: US 9,571,506 B2
(45) Date of Patent: *Feb. 14, 2017

(54) DYNAMIC ENTERPRISE SECURITY CONTROL BASED ON USER RISK FACTORS

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,935

(22) Filed: Jul. 7, 2016

(65) Prior Publication Data

US 2016/0315947 A1   Oct. 27, 2016

Related U.S. Application Data

(63) Continuation of application No. 14/613,746, filed on Feb. 4, 2015, now Pat. No. 9,413,786.

(51) Int. Cl.
*H04K 1/00* (2006.01)
*H04L 29/06* (2006.01)
*H04W 12/08* (2009.01)

(52) U.S. Cl.
CPC .......... *H04L 63/107* (2013.01); *H04L 63/083* (2013.01); *H04L 63/20* (2013.01); *H04W 12/08* (2013.01);

(Continued)

(58) Field of Classification Search
CPC ........ H04L 63/20; H04L 63/08; H04L 63/205; H04L 63/10; H04L 63/101; H04L 63/107; H04L 63/083; H04L 63/1433; G06Q 50/101; G06Q 10/0635; G06F 21/6218; G06F 21/31

(Continued)

(56) References Cited

U.S. PATENT DOCUMENTS 7,024,686 B2 *  4/2006  Brawn ................... H04L 29/06
                                                        726/1
7,249,188 B2 *  7/2007  Spicer ................... H04L 41/28
                                                        709/229

(Continued)

FOREIGN PATENT DOCUMENTS

WO    WO2013016721 A2    1/2013

OTHER PUBLICATIONS

Shivendra Tiwari et al, A Survey on LBS: System Architecture, Trends and Broad Research Areas, IIT Delhi, New Delhi, India, 2011.

(Continued)

*Primary Examiner* — Hosuk Song
(74) *Attorney, Agent, or Firm* — Patrick J. Daugherty; Driggs, Hogg, Daugherty & Del Zoppo Co., LPA (57) ABSTRACT

Aspects dynamically set enterprise-level security rules. Risk values representing likelihoods of loss of enterprise secure data are determined for different attributes of a user, and added together to generate a user risk factor. If the risk factor does not meet one or more off-site access threshold value(s), additional security enhancements applicable to the user and not enabled within currently applied security are iteratively selected and used to revise the security settings, and the risk factor is revised by a risk abrogation value of each of the selected security enhancements, until either the revised risk (Continued)

factor meets the off-site access threshold value(s) (wherein access is granted to the secure data from the off-site location pursuant to the revised security settings), or until no additional applicable security enhancements are available (wherein user access to the secure data from the off-site location is denied).

20 Claims, 6 Drawing Sheets

(52) U.S. Cl.
CPC .............. *G06F 2221/2111* (2013.01); *G06F 2221/2141* (2013.01); *G06F 2221/2149* (2013.01)

(58) Field of Classification Search
USPC .............. 726/1–6, 22–29; 713/168, 193; 709/224–225
See application file for complete search history.

(56) References Cited

U.S. PATENT DOCUMENTS

| | | | |
|---|---|---|---|
| 7,310,669 B2 | 12/2007 | Webb | |
| 7,415,723 B2 | 8/2008 | Pandya | |
| 7,813,947 B2 | 10/2010 | DeAngelis | |
| 7,900,259 B2* | 3/2011 | Jeschke | H04L 63/1433 713/164 |
| 8,095,984 B2* | 1/2012 | McFarlane | G06F 21/577 380/250 |
| 8,181,253 B1 | 5/2012 | Zaitsev et al. | |
| 8,205,239 B1 | 6/2012 | Satish | |
| 8,265,977 B2 | 9/2012 | Scarborough et al. | |
| 8,396,485 B2 | 3/2013 | Grainger et al. | |
| 8,438,643 B2* | 5/2013 | Wiemer | G06F 21/577 380/250 |
| 8,479,266 B1 | 7/2013 | Delker | |
| 8,700,709 B2 | 4/2014 | Axelrod et al. | |
| 9,413,786 B1* | 8/2016 | Boss | H04L 63/20 |
| 2011/0265162 A1 | 10/2011 | Alavandar et al. | |
| 2013/0117266 A1 | 5/2013 | Yahalom et al. | |
| 2013/0331087 A1 | 12/2013 | Shoemaker et al. | |

OTHER PUBLICATIONS

Buecker et al, Using the IBM Security Blueprint to Address Business Risks for Employee Offboarding, IBM, Redbooks, 2009.
Buecker et al, Stopping Internet Threats Before They Affect Your Business by Using the IBM Security Network Intrusion Prevention System, IBM, Redbooks, 2011.
Kellogg Brown & Amp, Managing Safety Risks Through the Employee Induction Process, IP.com, No. IPCOM000217747D, 2012.
IBM, Autonomic Control of Access Based on Physical Location, IP.com, No. IPCOM000018729D, 2003.
Disclosed Anonymously, Location-Based Security Configuration, IP.com, No. IPCOM000126828D, 2005.
Disclosed Anonymously, Mobile Device Resource Conservation During Geo-Location Operations, IP.com, No. IPCOM000231493D, 2013.
U.S. Appl. No. 14/613,746, filed Feb. 4, 2015.
Notice of Allowance (Mail Date May 3, 2016) for U.S. Appl. No. 14/613,746, filed Feb. 4, 2015.

* cited by examiner

```
Periodically do the following steps
      risk factor = 0
      For each person attribute,
            If attribute = true, then risk factor = risk factor + risk value associated to the
attribute
      end for While (risk factor > risk factor threshold) and (additional security actions remain to be
applied) then
            apply next security action
            risk factor = risk factor + reduction_value_of_security action      /* note that
reduction factors are negative in this embodiment illustration */
      End while if (risk factor > risk factor threshold) and (no additional security actions remain to be
applied) then inform service administrator
```

FIG. 6

DYNAMIC ENTERPRISE SECURITY CONTROL BASED ON USER RISK FACTORS

TECHNICAL FIELD

Aspects of the present invention relate to computer and other programmable device security, and more particularly to enterprise level data security software implementations for controlling data access by users via remote-access, converged communications, cloud environment and mobile device and application domains.

BACKGROUND

An enterprise may generally refer to a corporation, organization, department or other corporate structure wherein a plurality of different individuals work and function together toward a common purpose. Enterprise workspaces may feature local area network (LAN) security configurations that enable the access and sharing of data between enterprise storage devices and the devices of individual data users (employees, team members, consultants, students, etc.) while providing robust protection to secure data from outside access by requests originating outside of the LAN. However, such users may work from home or other locations away from controlled physical locations defining a controlled workspace within the LAN domain, via a wide variety of remote access and mobile programmable device and application structures. Such home and mobile device environments may be outside the control and scope of enterprise security structures, providing greater risk for targeting for corporate espionage and for inadvertent exposure via unsecure network connections and devices.

Intentional theft of confidential information from home and remote sites is also aided by social media and other public domain resources, which enable the identification of users within an enterprise who may have or have access to assets, such as confidential data and intellectual property. Thus, the devices and user login accesses of such users may be targeted for theft while in their home office or working via mobile devices off-site. The use of mobile devices to access confidential and high value corporate enterprise information is generally increasing. Such devices may be owned by an employee or other user, or operated off-premises in an insecure manner, resulting in increasing exposures to risk of physical loss relative to those devices and areas that remain under direct control of a given organization.

BRIEF SUMMARY

In one aspect of the present invention, a method for dynamically setting enterprise-level security rules as a function of assessing risk factors associated with a user includes determining risk values for respective ones of different attributes of a user. The risk values each represent a likelihood of loss of secure data of an enterprise as a function of association of the respective attribute with the user. The risk values are added together to generate a risk factor for the user, which is compared to one or more off-site access threshold values. In response to determining that the risk factor meets the off-site access threshold value(s), security settings associated with the user are applied and access is granted pursuant to the applied security settings to the user to the enterprise secure data from an off-site location of the user that is not within a local network of the enterprise. In response to determining that the risk factor does not meet the off-site access threshold value(s), the method determines whether additional security enhancements applicable to the user and not enabled within the applied security settings are available, and if so iteratively selects ones of the available additional security enhancements, revises the security settings by enabling the selected security enhancements, and revises the risk factor by a risk abrogation value of the selected security enhancement, until either (i) granting access to the user, pursuant to the revised security settings, to the enterprise secure data from the off-site location, in response to determining that the revised risk factor meets the off-site access threshold value(s); or (ii) denying access to the user to the enterprise secure data from the off-site location, in response to determining that there are no additional security enhancements applicable to the user and not enabled within the security settings.

In another aspect, a method provides a service for dynamically setting enterprise-level security rules as a function of assessing risk factors associated with a user. The method includes integrating computer-readable program code into a computer system including hardware processor in circuit communication with computer readable memory and a computer readable storage medium. The risk values each represent a likelihood of loss of secure data of an enterprise as a function of association of the respective attribute with the user. The computer readable program code includes instructions for execution by the processor that cause the processor to add the risk values together to generate a risk factor for the user, which is compared to one or more off-site access threshold values. In response to determining that the risk factor meets the off-site access threshold value(s), security settings associated with the user are applied and access is granted pursuant to the applied security settings to the user to the enterprise secure data from an off-site location of the user that is not within a local network of the enterprise. In response to determining that the risk factor does not meet the off-site access threshold value(s), the processor determines whether additional security enhancements applicable to the user and not enabled within the applied security settings are available, and if so iteratively selects ones of the available additional security enhancements, revises the security settings by enabling the selected security enhancements, and revises the risk factor by a risk abrogation value of the selected security enhancement, until either (i) granting access to the user, pursuant to the revised security settings, to the enterprise secure data from the off-site location, in response to determining that the revised risk factor meets the off-site access threshold value(s); or (ii) denying access to the user to the enterprise secure data from the off-site location, in response to determining that there are no additional security enhancements applicable to the user and not enabled within the security settings.

In another aspect, a system has a hardware processor in circuit communication with a computer readable memory and a computer-readable storage medium having program instructions stored thereon. The processor executes the program instructions stored on the computer-readable storage medium via the computer readable memory and thereby determines risk values for respective ones of different attributes of a user. The risk values each represent a likelihood of loss of secure data of an enterprise as a function of association of the respective attribute with the user. The risk values are added together to generate a risk factor for the user, which is compared to one or more off-site access threshold values. In response to determining that the risk factor meets the off-site access threshold value(s), security settings associated with the user are applied and access is granted pursuant to the applied security settings to the user to the enterprise secure data from an off-site location of the user that is not within a local network of the enterprise. In response to determining that the risk factor does not meet the off-site access threshold value(s), the processor determines whether additional security enhancements applicable to the user and not enabled within the applied security settings are available, and if so iteratively selects ones of the available additional security enhancements, revises the security settings by enabling the selected security enhancements, and revises the risk factor by a risk abrogation value of the selected security enhancement, until either (i) granting access to the user, pursuant to the revised security settings, to the enterprise secure data from the off-site location, in response to determining that the revised risk factor meets the off-site access threshold value(s); or (ii) denying access to the user to the enterprise secure data from the off-site location, in response to determining that there are no additional security enhancements applicable to the user and not enabled within the security settings.

In another aspect, a computer program product for dynamically setting enterprise-level security rules as a function of assessing risk factors associated with a user has a computer-readable storage medium with computer readable program code embodied therewith. The computer readable program code includes instructions for execution which cause the processor to determine risk values for respective ones of different attributes of a user. The risk values each represent a likelihood of loss of secure data of an enterprise as a function of association of the respective attribute with the user. The risk values are added together to generate a risk factor for the user, which is compared to one or more off-site access threshold values. In response to determining that the risk factor meets the off-site access threshold value(s), security settings associated with the user are applied and access is granted pursuant to the applied security settings to the user to the enterprise secure data from an off-site location of the user that is not within a local network of the enterprise. In response to determining that the risk factor does not meet the off-site access threshold value(s), the processor is thereby caused to determine whether additional security enhancements applicable to the user and not enabled within the applied security settings are available, and if so iteratively select ones of the available additional security enhancements, revise the security settings by enabling the selected security enhancements, and revise the risk factor by a risk abrogation value of the selected security enhancement, until either (i) granting access to the user, pursuant to the revised security settings, to the enterprise secure data from the off-site location, in response to determining that the revised risk factor meets the off-site access threshold value(s); or (ii) denying access to the user to the enterprise secure data from the off-site location, in response to determining that there are no additional security enhancements applicable to the user and not enabled within the security settings.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
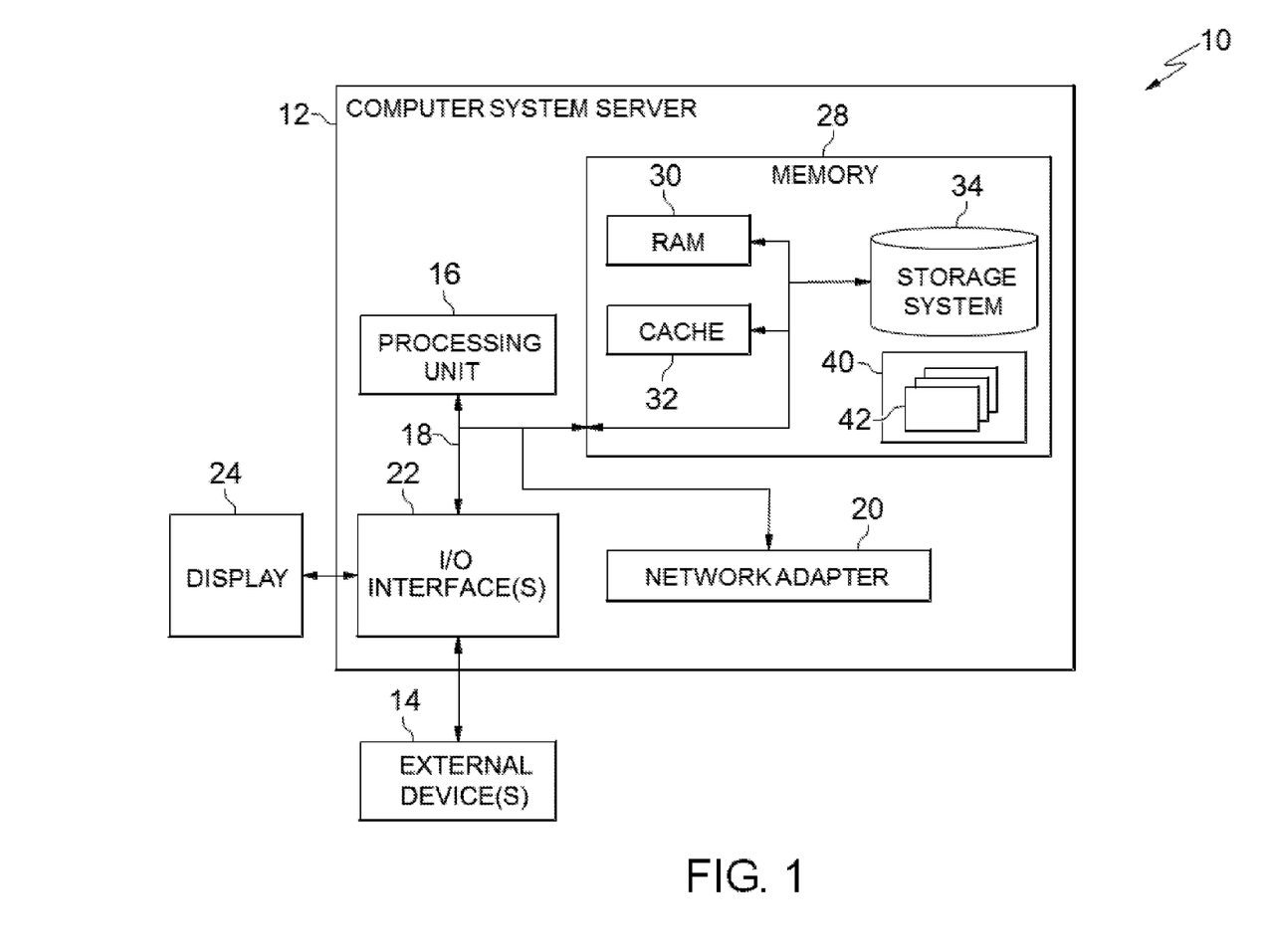
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
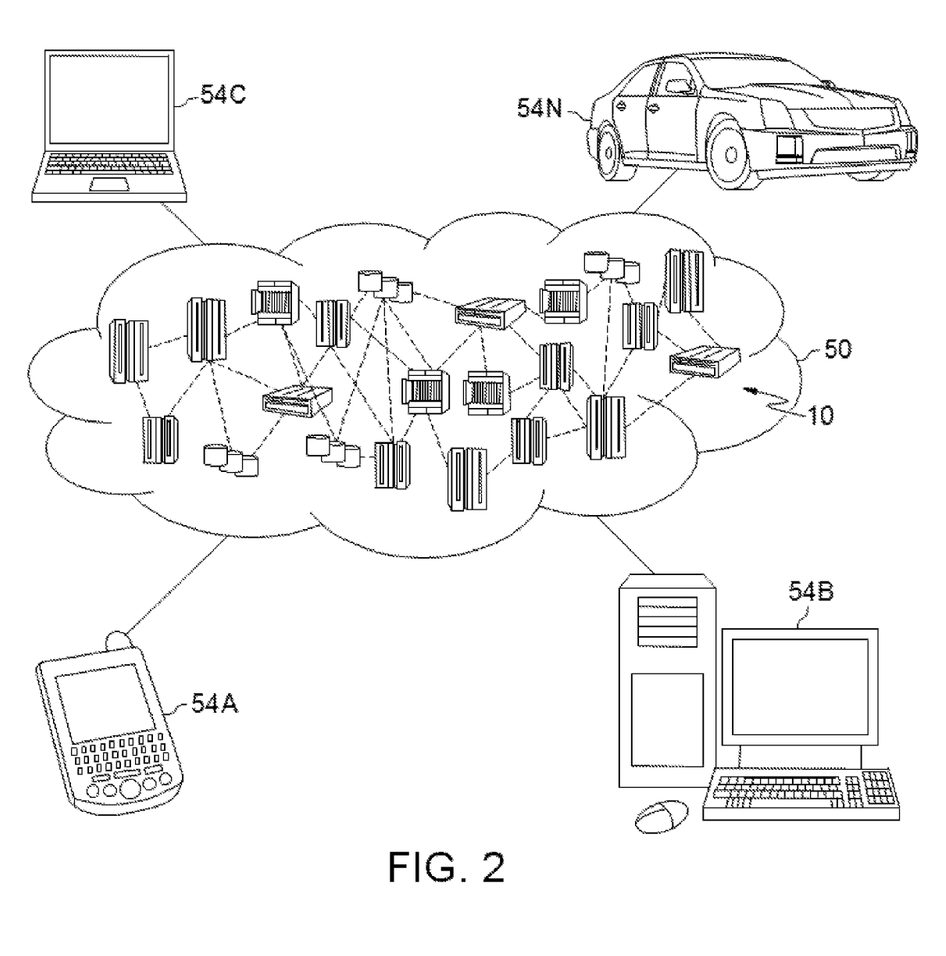
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
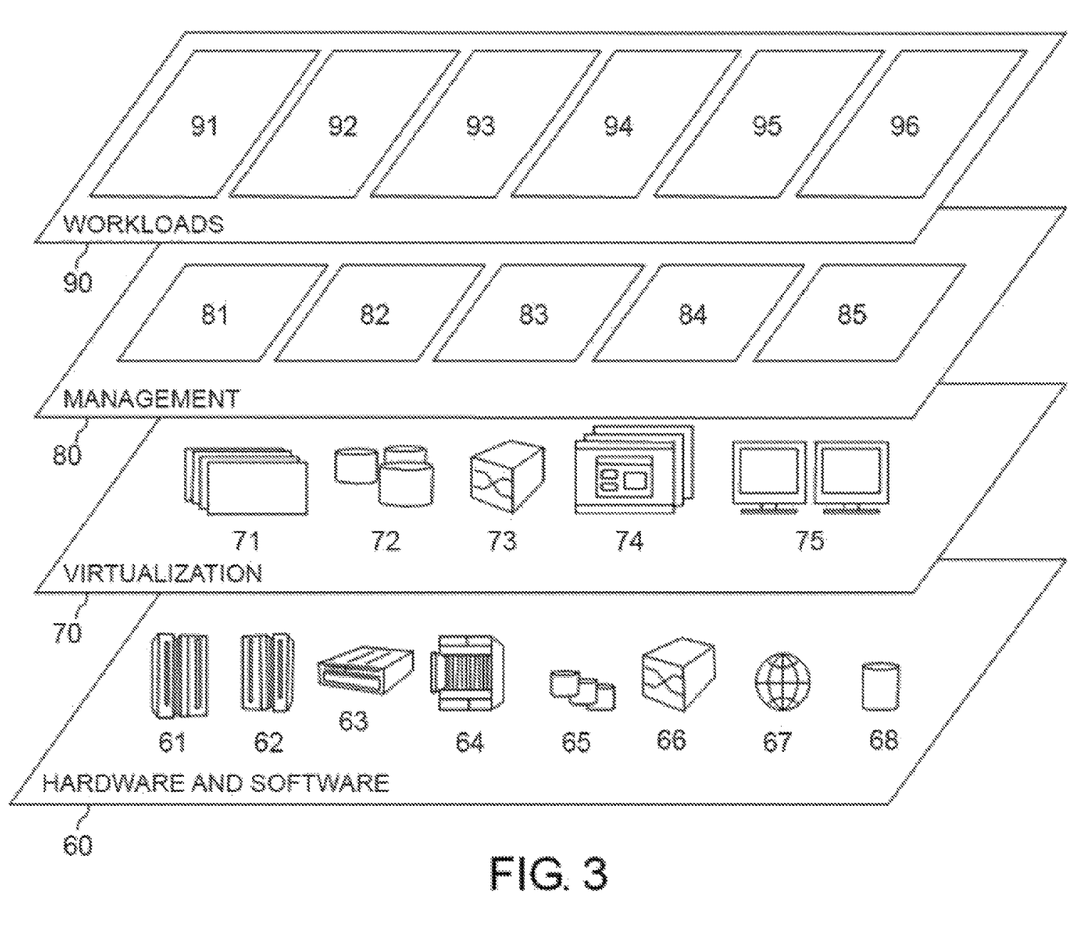
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources, implementing aspects of the present invention described below that dynamically set enterprise-level security rules for a user as a function of assessing risk factors associated with said user. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Figure 4:
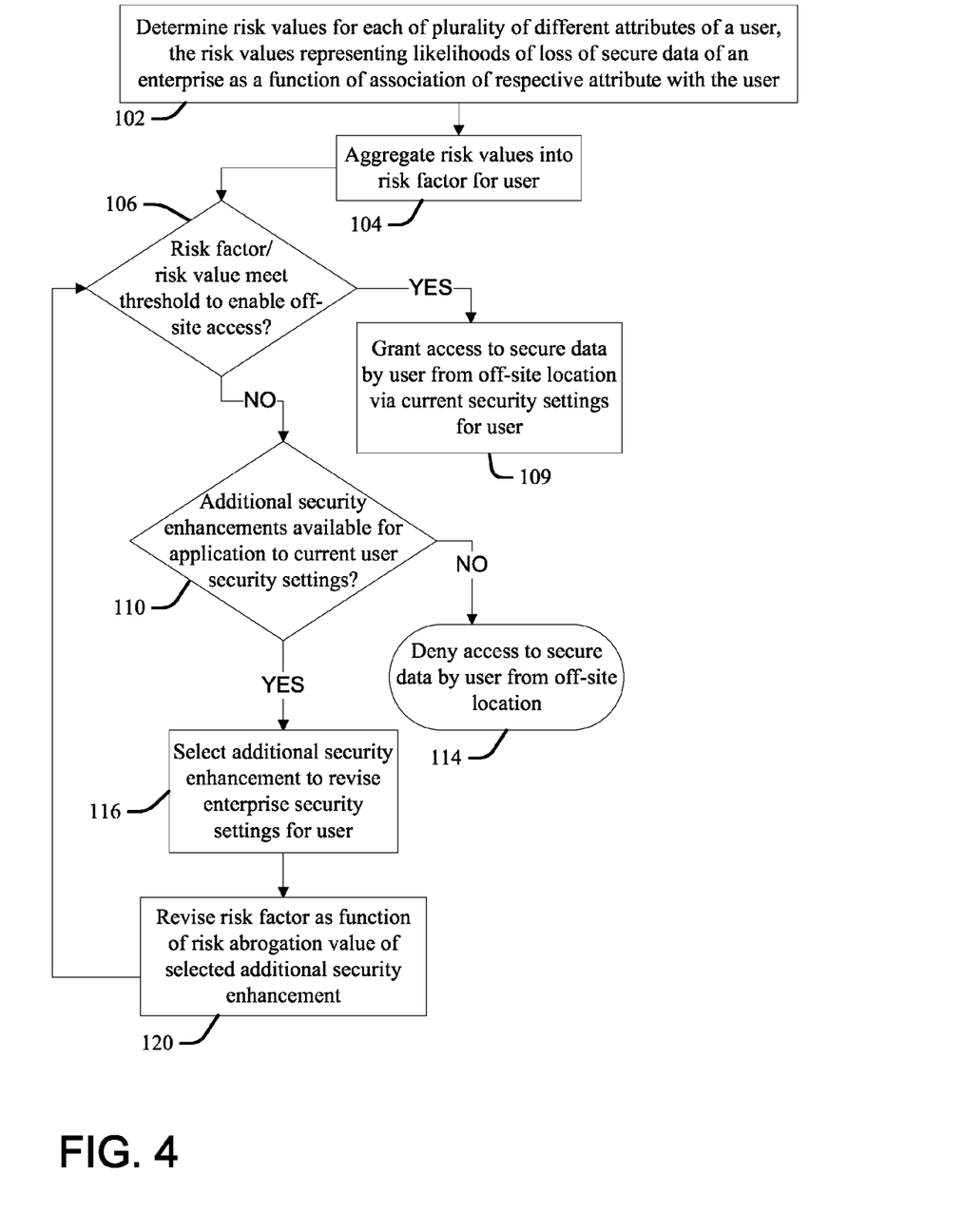
FIG. 4 is a flow chart illustration of a method or process layers for dynamically setting enterprise-level off-site security rules for a user as a function of assessing risk factors associated with said user according to an embodiment of the present invention.

FIG. 4 (or "FIG. 4") illustrates a method or process of an aspect of the present invention for dynamically setting enterprise-level off-site security rules for a user as a function of assessing risk factors associated with said user. It will be understood that the term "user" is used herein generically to refer to anybody (for example, member, employee, student, associate, partner, user, consultant, team member, user, etc.) who possesses or has access to secure or confidential enterprise data off the enterprise via networked devices or user login credentials.

At 102 a server processor (for example, a central processing unit (CPU)) executes code (for example, code installed on a storage device in communication with the processor) and thereby assigns or determines each of a plurality of individual, different risk values for respective ones of a plurality of different attributes of a user. The risk values each represent a likelihood of loss of secure data of an enterprise that are presented to the enterprise as a function of association of the individual attributes with the user. As is discussed more fully below, the values may be set at 102 as a function of the presence of specified other ones of the attributes of the user, wherein the presence or absence of another of the attributes may cause a change in value of the risk values.

The determinations at 102 may be in response to a request by the user for access to the secure data, or to another prompt, such as a periodic security audit prompt, change in title or workgroup assignment of the user within the enterprise, a report of a loss of a device by the user that has secure enterprise data or login information, an attack on the user's device or login credentials via a virus or third party, and still others will be apparent to one skilled in the art. Illustrative but not limiting or exhaustive examples of the secure data include trade secret, patent and other intellectual property data that is confidential, unpublished or secure and has value to the enterprise via maintaining the secure and non-public nature of the data.

The process of FIG. 4 selects from a collection of person attributes, the attributes of interest to the organization, and for each person attribute of interest, assigns a risk value at 102. The attribute risk values may be binary, wherein single values are used (for example, "yes" or "no"; one or zero, etc.). Or they represent different degrees of risk by different values, such as "risk value=number_of_lost_devices*5." Note that degrees of risk value need not be linear. The enterprise-level attributes considered at 102 are relevant to access to the enterprise data as defined from a perspective (or point of view) of the enterprise, and not from (and may be independent of) any particular end point used by the user for the data storage or access. The following are illustrative but not limiting or exhaustive examples of the enterprise-level attributes:

(i) A specific level of sensitivity assigned to the data by the enterprise (for example, top secret=10, secret=5 and unclassified=0, or one of some other grouping of different sensitivity levels).

(ii) Enterprise identity or role of the user requesting access to data, such as title (for example, ad rep=2, engineer=15 and senior vice president=25), position or department of the user; pre-authorizations via job responsibilities to data including data of a type or category of data sought by an application of the user (for example, human resources applications is assigned one value, finance applications another higher value, software development library applications another even higher value, and collaboration applications are assigned a lowest of the applications values).

(iii) Relations to others outside (external to) the enterprise. External relation attributes include numbers and frequencies of social network, blog and public media connections, followings and followers, which may include connections or activity relative to others associated with competitors or domains having known security concerns, or relationships with immediate or close family members who have obligations to competitors. Social network sources comprehend social community, forum or networks, and illustrative but not exhaustive examples include LinkedIn® Wikipedia™, Facebook® and Twitter®, and still others will be apparent to one skilled in the art. (LINKEDIN is a trademark of the Linkedin Corporation in the United States or other countries; WIKIPEDIA is a trademark of the Wikimedia Foundation in the United States or other countries; FACEBOOK is a trademark of Facebook, Inc. in the United States or other countries; TWITTER is a trademark of Twitter, Inc. in the United States or other countries.)

(iv) History of attacks on user computers or other programmable devices, or user accounts, virus infections, previous password reset occupancies (indicating lost or forgotten passwords) or authentication breaches recorded (for example, someone guessing a password and accessing a system without the person's knowledge) that are associated with credentials of the user.

(v) History of theft or loss of devices holding enterprise data or login information.

(vi) Identity of an application the user is using to access the data, relative to the enterprise (for example, in-house browser application operating on the enterprise server will have a lower risk value than one assigned to an outside or public browser).

(vii) Authorized enterprise application or information access levels. For example, doe the user have a high security level clearance? If so, he or she may receive a lower risk value.

(viii) Physical location of the data store containing the data. Is the data on a storage device physically located within a LAN of the enterprise, or on a hard drive located on a mobile computer or personal digital assistant (PDA) off-site? The processor of the process at 102 may extract or otherwise identify location context data that identifies a current geographic location of a user, or a domain used by the user to access the secure enterprise data, including the GPS (Geographic Positioning Satellite) coordinates of a mobile programmable device used by the user, in some aspects to identify a nation or other specific area, in order to compare the identified nation or area to known data export restrictions or correlation with historic espionage activities.

(ix) Attributes of the data storage device (for example, is the data encrypted with a key or other structure known only by an enterprise application, encrypted by a third party application selected by a user and outside the control of the enterprise, or unencrypted).

(x) Attributes of the user application used for the access request (hosted on-sight by the server, or off-site by another server or device, or security rating of the hosting infrastructure).

(xi) Number of people with access to the application data storage device holding the data to be accessed (is the data limited to members of one or more workgroups of specifically identified persons that are fixed or certain in number, or available to any number of users possessing proper credentials issued or verified by the enterprise).

(xii) Correlation of the time of day and day of week of the present access to the time or day that the application data storage device is typically used to access this data. For example, a time of access risk value may be generated for the user in response to determining that a time of a request by the user to access the enterprise secure data is outside of historical time periods encompassing past, authorized accesses to the enterprise secure data. Thus, payroll data may be typically accessed bi-weekly on Monday mornings after 8:00 AM and no later than 11:00 AM of a time zone of an enterprise workspace, wherein access outside of this range of days and time may be indicative of an improper request.

(xiii) Nationality of user: is the country of nationality of the user subject to export restrictions or foreign licensing requirements application to intellectual property created and assigned to the enterprise? And if so, is the current location of the user within the borders of said nation?

Aspects rate or otherwise determine or assess the risk to the enterprise of loss of the secure data in granting off-site access by the user as a function of determined risk values. In the present aspect, security permissions and other settings are set for off-site access, defined generally as home office, mobile device, remote log in, third party site LAN access, or other accesses located outside of an enterprise workspace LAN) to the secure data by the user as a function of aggregating the risk values at 104 into an overall "risk factor" for that user, which signifies an aggregate measure of risk for the user. Thus where the risk values determined at 102 are positive numerical values, they may be added together at 104 to determine the risk factor value at 104.

Aggregate risk factors may be set or adjusted or weighted at 104 as a function of the presence or values of specific attribute risk values relative to other ones. This recognizes that attribute risk values considered in combination may indicate skills or competency, or a lack thereof, which makes the user more or less susceptible to security breaches. For example, a history or frequency of past reports of lost or stolen devices (e.g. laptops, phones, tablets) may be correlated to travel or location context in common with locations of reported losses and thefts, triggering an increase in risk values (or an aggregate risk factor determined therefrom) for a current location of the user's remote domain or device location when seeking access to the secure data, relative to the risk value assigned to said location without the context of the prior loss/theft activity. Occurrences or frequencies of virus infections in combination with a history of password reset occupancies (indicating lost or forgotten passwords) or authentication breaches recorded (for example, someone guessing a password and accessing a system without the user's knowledge) may also result in increasing risk values determined for home or mobile location attributes, as distinguished from risk values otherwise assigned to said current home or mobile location attributes.

At 106 the process (processor) determines if the risk factor (or an individual attribute risk value) meets a threshold condition (value) for enabling the user to access secure data of the enterprise from an "off-site location," namely outside of an enterprise LAN and the security structures presented thereby. If the threshold condition is met at 106, then at 109 access is granted to the secure data by the user from the off-site location via current security settings (including procedures) in place for the user (for example, standard password login procedures and reauthorization time periods to prompt password re-entry, etc.).

Else, at 110 the process determines whether additional (thus far unselected) security enhancements are available to modify the security settings applicable for the secure data access for this user (applicable to the user). If none are available at 110, then access is denied for the off-site access at 114. However, if additional (unselected) security enhancements are available, then one or more are selected to revise enterprise security settings for granting off-site access at 116.

The selected enhancements may revise, replace or augment existing security settings currently applicable to the user while working on-site, as implemented to authorize the respective home or mobile access. Each of the security enhancements selected at 116 are associated with a risk abrogation value, and at 120 the risk factor is recalculated in response to subtracting the security abrogation values assigned to the selected enhancements at 116 from a current value of the risk factor.

The revised risk factor is again compared to the off-site access threshold at 106 in order to determine whether to grant access at 109 as a function of implementing the selected security enhancements. The process is iterative, so that where the risk values determined at 102 are positive numerical values that are added together at 104 to determine the risk factor value at 104, the security abrogation values may be negative numerical values that are added to the risk factor in each iteration at 120 to reduce the (revised) risk factor until it meets the respective, applied one or more security threshold values at a subsequent iteration of step 106.

Security enhancements selected and imposed at 116 to enable off-site access may include additional or stronger password requirements, increasing the frequency of locking applications and requiring reentry of passwords to continue data access, and limiting access to certain information or applications that are available to the user on site of the enterprise.

Figure 5:
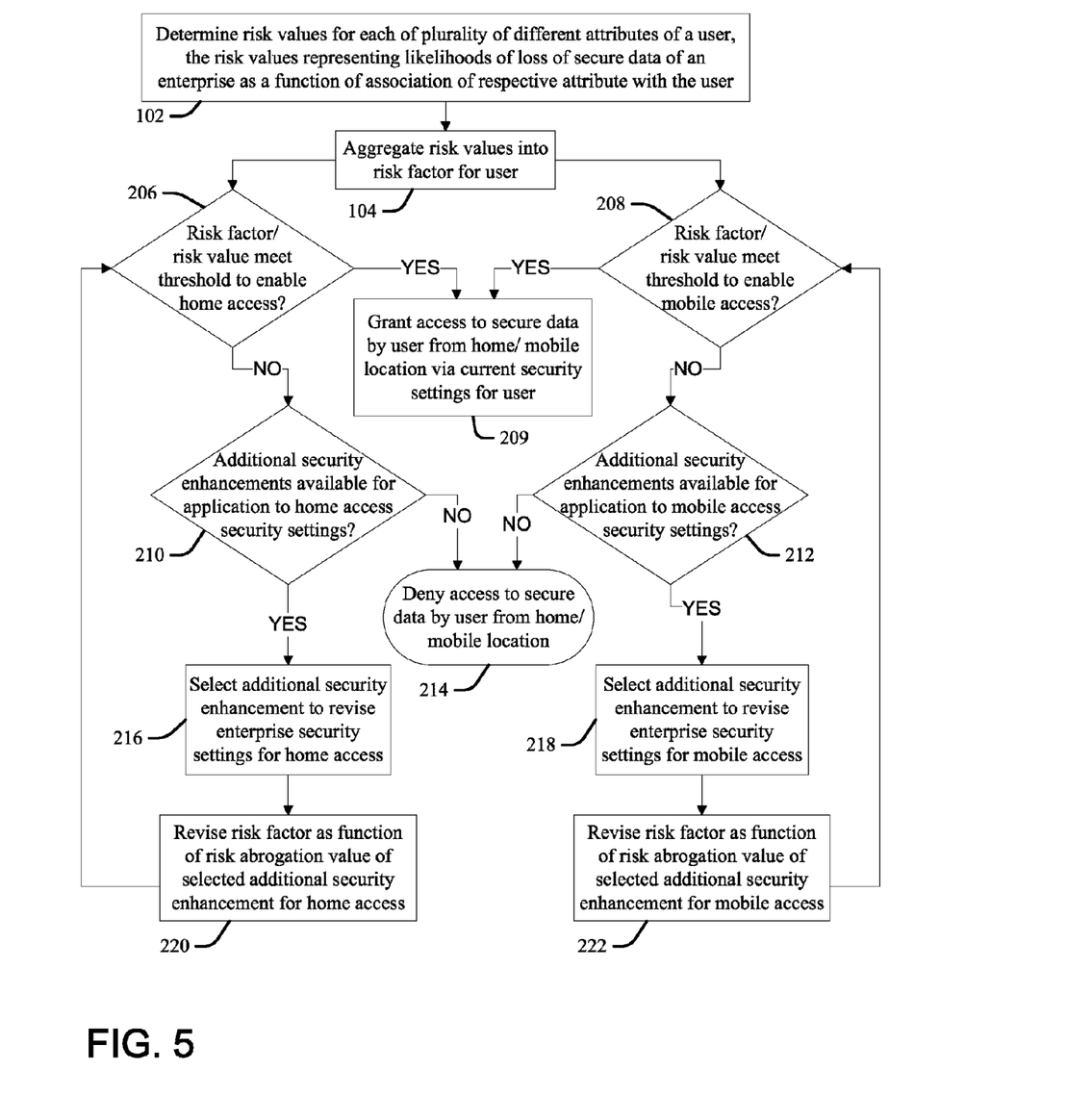
FIG. 5 is a flow chart illustration of another method or process for dynamically setting enterprise-level off-site security rules for a user as a function of assessing risk factors associated with said user according to an embodiment of the present invention.

Aspects may differentiate the setting and selection of security measures applicable to the user based on attributes of a location of the user. FIG. 5 illustrates another aspect that considers some off-site locations (in this example, a home office) more secure than another, more public mobile locations (here generically referred to as "mobile"). Thus, a processor determines if the risk factor determined via the steps/processes 102 and 104 discussed above meets a threshold condition (value) for enabling the user to work from "home" at 206 (signifying access to an enterprise LAN and data thereon off-site from a location determined to be within a home network location of the user), and at 208 if the risk factor (and/or individual attribute risk value) meets a threshold condition (value) for enabling the user to work from a "mobile" location (signifying access to the enterprise LAN and data thereon off-site from another location that is not within the home network location).

The example of FIG. 5 differentiates home and mobile access for the purposes of selecting appropriate enhancements as needed at steps 210 or 212, respectively, in order to tailor or target the enhancements to differences in threat exposures or the levels thereof that are presented at these different domains. It will be appreciated by one skilled in the art that other criteria may be used to treat different off-site locations with different security procedures, and the present example is illustrative but not exhaustive of aspects of the present invention.

If the threshold conditions are met at 206 or 208, then the enterprise grants access to the secure data by the user from the applicable home or mobile location at 209 via current security settings in place for the user. Else, at 210 and 212 the process determines whether additional (thus far unselected) security enhancements are available to modify the security settings applicable for the respective home and mobile access. If none are available at 210 or 212, then access is denied for the respective home or mobile access at 209.

However, if additional (unselected) security enhancements are available, then one or more are selected to revise enterprise security settings for granting home access at 216 and/or for granting mobile access at 218. The enhancements may revise, replace or augment existing security settings currently applicable to the user while working on-site, as implemented to authorize the respective home or mobile access.

Each of the security enhancements selected at 216 or 218 are associated with a risk abrogation value, and at 220 and 222 the risk factor is recalculated in response to the security abrogation values assigned to the selected enhancements at 216 or 218. The revised risk factor is again compared to the home access threshold at 206 or to the mobile access threshold at 208 in order to determine whether to grant access at 209 as a function of implementing the selected security enhancements. In aspects where the risk values determined at 102 are positive numerical values that are added together at 104 to determine the risk factor value at 104, the security abrogation values may be negative numerical values that are added to the risk factor at 220 and 222 to reduce the (revised) risk factor until it meets the respective, applied one or more security threshold values at 206 and 208.

In one example, security enhancements selected and imposed at 216 to enable home access include additional or stronger password requirements, increasing the frequency of locking applications and requiring reentry of passwords to continue data access, and limiting access to certain information or applications that are available to the user on site of the enterprise. Enhancements selected and imposed at 218 to enable mobile access include higher, more restrictive levels of the security measures imposed for home access at 216 (for example, shorter time periods between requiring password reentry), as well as sending a signal to the user's mobile device to turn off USB ports and BlueTooth™ connections, forcing a virus scan to be executed on the device (which may execute in the background and unknown to the user) or decreasing periodicity between scheduled executions, and in some instances shutting down the computer or its access to enterprise data of concern until location data indicates it is relocated to a more secure location, such as on the home network or within a workplace or other enterprise LAN location. (BLUETOOTH is a trademark of Bluetooth SIG, Inc., in the United States or other countries.)

In one example, a distinguished engineer in a micro-chip tech company is working on the next microprocessor. Risk values assigned to the person's title, his or her level of social media information activity, pay information, etc., aggregate to a high risk factor value that fails the threshold comparisons at 206 or 208, pointing both to an importance of his or her role, and indicating too high of a risk to theft exposure, wherein an enhancement selected at 210 entirely prevents access to some types of sensitive data by this person while working from home via access granted at 214 in a subsequent iteration of the threshold comparison at 206. Further, while he or she is working from home access, current security methods may be modified so that authentication is more secure. For example, this distinguished engineer may have policies on his or her laptop updated to require an inactivity password lockout to occur every 10 minutes while using home access, rather than the standard 30 minutes which would be in effect if he or she were working from the work office. Further, while in the office and using a company provided desktop, the distinguished engineer may be granted access to "n" applications and "y" instances of information, but wherein an enhancement selected at 216 causes an enterprise security system to limit access granted at 209 at home to only a few (subset) of the "n" applications and only a few (subset) of the "y" instances of information.

Determination of the risk factor at 104 and the imposition of security enhancements at 116, 216 and 218 in response to the comparison of the applicable thresholds at 106, 206 and 208 are functions of considerations of quantifiable, measurable characteristics which make individuals more or less prone to corporate espionage, information loss or exposure. Thus, a first company with lots of trade secrets may assign higher risk value to titles of users that have access to trade secrets than the values assigned to comparable titles within a second that has fewer trade secrets. Another company may assign differentiated risk values to different positions within the company. In one example, a risk value assigned to the position of janitor, in combination with a risk value assigned to possession of a physical key to a sensitive location by the janitor and a risk value created by a history of several security incidents on premises occupied by the janitor, may result in a first risk factor determined for the janitor that is higher than a second risk factor determined for a senior vice president as a function of a risk value associated with the senior vice president title and another risk value assigned to a level of access to trade secrets of the enterprise by this title. Conversely, a third risk factor value determined for the janitor where the facility has no history of access incidents may be lower (less risky) than a fourth risk factor determined for the senior vice president, even if the senior vice president has a risk value signifying no access to sensitive information, but wherein the senior vice president works at a location with a history of many incidents, which triggers a high value for workplace location security risk that is used to calculate the senior vice president risk factor, or to determine the aggregated risk factor therefrom. Thus, the distribution of security risk values to attributes, and their aggregation into total or composite risk factors for any user, may be customizable by any given enterprise in response to their unique business context.

Figure 6:
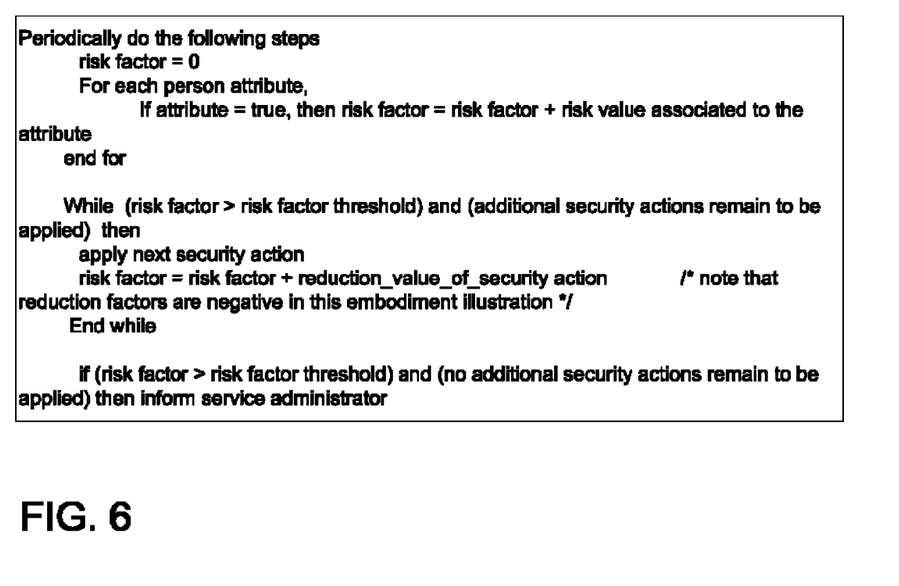
FIG. 6 is a graphical, tabular depiction of a software algorithm useful for setting a risk factor from positive risk values and negative security abrogation values according to an embodiment of the present invention.

FIG. 6 is an exemplary tabular illustration of one software algorithm useful for setting the risk factor from positive risk values and negative security abrogation values. Illustrative but not limiting or exhaustive examples of negative security enhancements that are selected at 116, 216 or 218 and their associated security abrogation values include Decrease login inactivity time-out, −4; Use two factor authentication, −15; Move to a closed office space, −5; Turn encryption on for all email communication, −8; Agree to restrict access to USB and DVD devices, −4; Restrict or prevent access to a sensitive application, −8; Restrict or prevent access to sensitive data, −7; Allow access to applications or information only from a device with certain specific security controls, −9; Allow access to applications or information only if thru a specific VPN, −11; Add an HDD password at power on, −10; and if Executive works from home and risk value reaches a set risk threshold, the business automatically provides and pays for home security system if one does not exist, −5.

Determining a risk reduction value for each security action selected (for example, increase password length, restrict or prevent access to certain information or applications, etc.) may be a function of a specified or determined order of application of security actions for automatic selection. For example, increase password length in a first iteration of 116, 216 or 218, restrict granted access to the lowest value information in a second iteration, restrict access to the next lowest value information in a third iteration, and restrict access to application "abc" in a fourth iteration. They may also be manually chosen (such as by the user or a security system administrator) at each iteration, with the process prompting the user/administrator to select another enhancement at each iteration at 116, 216 or 218 in response to a reconsideration of the revised risk factor still failing to meet a necessary threshold at subsequent iterations at 106, 206 or 208.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically setting enterprise-level security rules, the method comprising executing on a computer processor the steps of:
   in response to determining that a risk factor for a user does not meet an off-site access threshold value, determining whether an additional security enhancement of a plurality of additional security enhancements that are applicable to the user is not enabled within security settings associated with the user; and
   in response to determining that the additional security enhancement is applicable to the user and is not enabled within the security settings associated with the user, iteratively selecting a one of the additional security enhancements that is not currently enabled within the security settings, revising the security settings by enabling the selected one of the additional security enhancements within the security settings, and revising the risk factor by a risk abrogation value of the selected one of the additional security enhancements, until:
   granting access to the user, pursuant to the revised security settings, to enterprise secure data from an off-site location, in response to determining that the revised risk factor meets the off-site access threshold value; or
   denying access to the user to the enterprise secure data from the off-site location, in response to determining that there is no one of the additional security enhancements that is not enabled within the security settings or within the revised security settings.

2. The method of claim 1, wherein the access granted to the enterprise secure data to the user from the off-site location pursuant to the revised security settings is provided as a service in a cloud environment.

3. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the steps of determining whether the additional security enhancement of the plurality of additional security enhancements that are applicable to the user is not enabled within security settings associated with the user in response to determining that the risk factor does not meet the off-site access threshold value, and, in response to determining that the additional security enhancement is applicable to the user and is not enabled within the security settings associated with the user, iteratively selecting the one of the additional security enhancements that is not currently enabled within the security settings, revising the security settings by enabling the selected one of the additional security enhancements within the security settings, and revising the risk factor by the risk abrogation value of the selected one of the additional security enhancements, until granting access to the user pursuant to the revised security settings to the enterprise secure data from an off-site location in response to determining that the revised risk factor meets the one off-site access threshold value, or denying access to the user to the enterprise secure data from the off-site location in response to determining that there is no one of the additional security enhancements that is not enabled within the security settings or within the revised security settings.

4. The method of claim 1, wherein the off-site access threshold value comprises a home threshold value that is applicable to access to the enterprise secure data by the user from within a home network location of the user that is not within a local network of the enterprise, and a mobile threshold value that is different from the home threshold value and is applicable to access to the enterprise secure data by the user from a mobile location that is not within the home network or within the enterprise local network; and
   wherein the step of iteratively selecting the one of the additional security enhancements further comprises:
   selecting a first one of the additional security enhancements in response to determining that the risk factor does not meet the home access threshold value; and
   selecting a second one of the additional security enhancements in response to determining that the risk factor does not meet the mobile access threshold value, wherein the second additional security enhancement is different from and more restrictive than the first additional security enhancement.

5. The method of claim 4, wherein the selected first additional security enhancement is selected from the group consisting of an additional password requirement, increasing a frequency of locking an application used for the user for access to the enterprise secure data and requiring reentry of a password to continue access by the user to the enterprise secure data; and
   wherein the selected second additional security enhancement comprises causing a mobile device of the user mobile device to turn off a connection selected from the group consisting of a universal serial bus port and a blue tooth connection.

6. The method of claim 5, wherein the selected second additional security enhancement is selected from the group consisting of forcing a virus scan to execute on the mobile device of the user, shutting down the mobile device of the user until location data indicates that the mobile device of the user is relocated to another location that is within the home network, and shutting down the mobile device of the user until location data indicates that the mobile device of the user is relocated to another location that is within the enterprise local area network.

7. The method of claim 1, further comprising:
   determining risk values for respective ones of a plurality of different attributes of a user, wherein the risk values each represent a likelihood of loss of secure data of an enterprise as a function of association of the respective ones of the plurality of different attributes of the user;

adding the risk values together to generate the risk factor for the user; and in response to determining that the risk factor meets the off-site access threshold value, applying the security settings associated with the user and granting access, pursuant to the applied security settings, to the enterprise secure data by the user from an off-site location of the user that is not within a local network of the enterprise.

8. The method of claim 7, wherein the step of determining the risk values for the respective ones of the plurality of different attributes of the user comprises:

assigning a first risk value to an enterprise title of the user in response to identifying that the user has access to a first quantity of trade secrets of the enterprise; and assigning a second risk value that is larger than the first risk value to the enterprise title of the user in response to identifying that the user has access to a second quantity of trade secrets of the enterprise that is larger than the first quantity of trade secrets.

9. The method of claim 7, wherein the step of determining the risk values for the respective ones of the plurality of different attributes of the user comprises:

determining an exposure risk value for the user selected from the group consisting of a multiple of a number of mobile devices that the user has lost, and a number of previous enterprise authentication breaches associated with credentials of the user.

10. The method of claim 7, wherein the step of determining the risk values for the respective ones of the plurality of different attributes of the user comprises:

generating a time of access risk value for the user in response to determining that a time of a request by the user to access the enterprise secure data is outside of a historical time period that encompasses authorized accesses to the enterprise secure data.

11. The method of claim 7, wherein the step of determining the risk values for the respective ones of the plurality of different attributes of the user comprises:

determining a social network risk value for the user as a function of a social network value selected from the group consisting of a number of social network connections, a number of social network followings and a number of social network followers.

12. The method of claim 11, wherein the step of determining the social network risk value for the user comprises:

increasing a value of the social network risk value in response to identifying a connection of the user to another who is associated with a competitor of the enterprise.

13. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to a determination that a risk factor for a user does not meet an off-site access threshold value, determines whether an additional security enhancement of a plurality of additional security enhancements that are applicable to the user is not enabled within security settings associated with the user; and
in response to a determination that the additional security enhancement is applicable to the user and is not enabled within the security settings associated with the user, iteratively selects a one of the additional security enhancements that is not currently enabled within the security settings, revises the security settings by enabling the selected one of the additional security enhancements within the security settings, and revises the risk factor by a risk abrogation value of the selected one of the additional security enhancements, until:
granting access to the user, pursuant to the revised security settings, to enterprise secure data from an off-site location, in response to determining that the revised risk factor meets the off-site access threshold value; or
denying access to the user to the enterprise secure data from the off-site location, in response to determining that there is no one of the additional security enhancements that is not enabled within the security settings or within the revised security settings.

14. The system of claim 13, wherein the processor executes the program instructions stored on the computer-readable storage medium via the computer readable memory and thereby further grants access to the user to the enterprise secure data from the off-site location pursuant to the revised security settings as a service in a cloud environment.

15. The system of claim 13, wherein the off-site access threshold value comprises a home threshold value that is applicable to access to the enterprise secure data by the user from within a home network location of the user that is not within a local network of the enterprise, and a mobile threshold value that is different from the home threshold value and is applicable to access to the enterprise secure data by the user from a mobile location that is not within the home network or within the enterprise local network; and wherein the processor executes the program instructions stored on the computer-readable storage medium via the computer readable memory and thereby further iteratively selects the one of the additional security enhancements by:

selecting a first one of the additional security enhancements in response to determining that the risk factor does not meet the home access threshold value; and selecting a second one of the additional security enhancements in response to determining that the risk factor does not meet the mobile access threshold value, wherein the second additional security enhancement is different from and more restrictive than the first additional security enhancement.

16. The system of claim 15, wherein the selected first additional security enhancement is selected from the group consisting of an additional password requirement, increasing a frequency of locking an application used for the user for access to the enterprise secure data and requiring reentry of a password to continue access by the user to the enterprise secure data; and wherein the selected second additional security enhancement comprises causing a mobile device of the user mobile device to turn off a connection selected from the group consisting of a universal serial bus port and a blue tooth connection.

17. A computer program product for dynamically setting enterprise-level security rules as function of assessing risk factors associated with a user, the computer program product comprising:

a computer readable storage device having computer readable program code embodied therewith, wherein the computer readable storage device is not a transitory signal per se, the computer readable program code comprising instructions for execution by a processor that cause the processor to:

in response determining that a risk factor for a user does not meet an off-site access threshold value, determine whether an additional security enhancement of a plurality of additional security enhancements that are applicable to the user is not enabled within security settings associated with the user; and in response to a determining that the additional security enhancement is applicable to the user and is not enabled within the security settings associated with the user, iteratively select a one of the additional security enhancements that is not currently enabled within the security settings, revise the security settings by enabling the selected one of the additional security enhancements within the security settings, and revise the risk factor by a risk abrogation value of the selected one of the additional security enhancements, until:

granting access to the user, pursuant to the revised security settings, to enterprise secure data from an off-site location, in response to determining that the revised risk factor meets the off-site access threshold value; or denying access to the user to the enterprise secure data from the off-site location, in response to determining that there is no one of the additional security enhancements that is not enabled within the security settings or within the revised security settings.

18. The computer program product of claim 17, wherein the off-site access threshold value comprises a home threshold value that is applicable to access to the enterprise secure data by the user from within a home network location of the user that is not within a local network of the enterprise, and a mobile threshold value that is different from the home threshold value and is applicable to access to the enterprise secure data by the user from a mobile location that is not within the home network or within the enterprise local network; and wherein the computer readable program code instructions for execution by the processor further cause the processor to iteratively select the additional security enhancements by:

selecting a first of the additional security enhancements in response to determining that the risk factor does not meet the home access threshold value; and selecting a second of the additional security enhancements in response to determining that the risk factor does not meet the mobile access threshold value, wherein the second additional security enhancement is different from and more restrictive than the first additional security enhancement.

19. The computer program product of claim 18, wherein the selected first additional security enhancement is selected from the group consisting of an additional password requirement, and increasing a frequency of locking an application used for the user for access to the enterprise secure data and requiring reentry of a password to continue access by the user to the enterprise secure data; and wherein the selected second additional security enhancement comprises causing a mobile device of the user mobile device to turn off a connection selected from the group consisting of a universal serial bus port and a blue tooth connection.

20. The computer program product of claim 19, wherein the selected second additional security enhancement is selected from the group consisting of forcing a virus scan to execute on the mobile device of the user, shutting down the mobile device of the user until location data indicates that the mobile device of the user is relocated to another location that is within the home network, and shutting down the mobile device of the user until location data indicates that the mobile device of the user is relocated to another location that is within the enterprise local area network.

* * * * *